United States Patent [19]

Titz

[11] Patent Number: 4,794,867
[45] Date of Patent: Jan. 3, 1989

[54] OMNIBUS SUITABLE FOR TRAIN FORMATION

[75] Inventor: Walter Titz, Auenwald, Fed. Rep. of Germany

[73] Assignee: Daimler-Benz Aktiengesellschaft, Stuttgart, Fed. Rep. of Germany

[21] Appl. No.: 140,636

[22] Filed: Jan. 4, 1988

[30] Foreign Application Priority Data

Jan. 9, 1987 [DE] Fed. Rep. of Germany ....... 3700464

[51] Int. Cl.⁴ .......................... B61D 17/00; B61G 5/06
[52] U.S. Cl. .......................... 105/3; 105/8.1; 213/1 R; 213/1.3; 213/74; 213/78; 280/491 A; 280/408
[58] Field of Search .............. 105/1.4, 3, 8.1; 104/247; 213/1.3, 4, 224, 21, 12, 20, 74, 75 R, 77, 78, 50, 76, 62 R, 63, 1 R; 180/14.1, 131, 79; 280/491 A, 408, 462

[56] References Cited

U.S. PATENT DOCUMENTS

| | | | |
|---|---|---|---|
| 1,908,542 | 5/1933 | Regan | 213/50 |
| 2,954,240 | 9/1960 | Welling | 280/462 |
| 2,996,018 | 8/1961 | Aspenberg | 105/3 |
| 3,552,580 | 1/1971 | Cope | 213/1.3 |
| 3,979,133 | 9/1976 | Morris | 280/491 A |
| 4,436,170 | 3/1984 | Mehren et al. | 104/247 |

FOREIGN PATENT DOCUMENTS 7707887 1/1979 Sweden .................... 213/1.3

Primary Examiner—Robert B. Reeves
Assistant Examiner—Joseph D. Pape
Attorney, Agent, or Firm—Barnes & Thornburg

[57] ABSTRACT

The invention relates to an omnibus which is suitable for train formation, can be driven independently and can either be freely steered or guided on tracks. In order not to disfigure the omnibus front by protruding coupling devices, and to be able to carry out the coupling operation without an assistant from the driver's position of the particular omnibus to be coupled, it is envisaged that at least the front coupling is designed in the form of a bar which can be extended or retracted under remote control. In the extended state, the bar can be moved under control within limits and can be engaged with the counter coupling head of the omnibus in front. The coupled omnibuses of a train are simultaneously and uniformly controlled from the driver's position of the first omnibus with regard to all their traction and braking functions. Consequently, the coupling bars between the omnibuses are substantially relieved of towing and braking forces; the coupling bars have essentially only the function of keeping the omnibuses coupled together in a train at a distance from one another. Thanks to this function, the coupling bars can also be arranged in an inclined position and/or off-center.

8 Claims, 3 Drawing Sheets

OMNIBUS SUITABLE FOR TRAIN FORMATION

BACKGROUND AND SUMMARY OF THE INVENTION

The invention relates to an omnibus suitable for train formation of the type disclosed for example in German Published Unexamined Patent Application (DE-OS) 2,643,325.

In the case of the known omnibus, the front coupling and the rear coupling are not attached fixedly but are laterally displaceable in arc-shaped horizontally running guide rails. To be precise the guide rails are curved in each case concentrically to the center point of the driven rear axle of the omnibus. In this way, when omnibuses are coupled together, the laterally displaceable coupling device brings itself into the connecting line between the center point of the driven rear axle of the front bus and the center point of the driven rear axle of the rear bus. The point of this arrangement is to exert on omnibuses coupled together transverse forces, directed towards the outside of the bend, by reaction forces within the coupling device. The intention is that the transverse forces tend to urge the track-guided buses toward the lateral guide flange on the side of the outside of the bend and to ensure track guidance along the lateral guide flange on the outside of the bend, because a contact of the track guidance elements with the corresponding lateral guide flange on the inside of the bend can easily be lost. An important reason for the loss of a track guidance contact on the side of the inside of the bend in the case of tight bends is that the lateral guide flange on the inside of the bend is often omitted on tight bends because the lateral offset of the trailing rear axle is greater on tight bends than the clear space between the vehicle wheels and the lateral guide flanges when travelling in a straight line.

The train formation of track-guidable dual-mode buses on different routes becomes expedient if there is a high volume of traffic and they share the same route some of the way, because buses coupled together are regarded as one vehicle unit and consequently more omnibuses per unit of time can be fed through a busy track guidance section. A disadvantage with the known coupling system for omnibuses is that the coupling device is very short and thus cannot be seen during the coupling operation by the driver of the omnibus coupled at the rear; it is therefore always necessary as a practical matter to have a second person during coupling. A further disadvantage of the known omnibus is that the front and rear couplings disfigure the end faces of the omnibuses in a very ugly or unattractive manner.

An object of the invention is to design the omnibus of the basic generic type in such a way that, despite the attachment of front and rear couplings, the omnibuses can retain their customary appearance, accepted by the public, and that it is possible to couple a bus to a bus in front of it without a second person and without the driver getting out.

This object is achieved according to preferred embodiments of the invention by providing a combination of the following features;

(a) at least the front coupling is designed in the form of a bar which can be extended from the outer contour of the omnibus in travelling direction or retracted into it under remote control, and, in the not yet completely extended state, guided such that it can only be moved longitudinally;

(b) the horizontal swivel bearings of the front coupling and of the rear coupling are—in the extended state of the parts of the coupling device prepared for a coupling of omnibuses—in each case arranged in the area of the front or of the rear outer contour, respectively, of the omnibus;

(c) in the at least partially extended state necessary for coupling, the bar is held by buffers, stops or the like with respect to the vertical direction and the horizontal direction in the coupling position necessary for the coupling of the omnibuses standing in line one behind the other in travelling direction;

(d) at least the driving functions such as traction, gear changing and braking of the omnibuses suitable for train formation can be operated in a way known per se in each case from the driver's position under remote control;

(e) as well as the coupling heads, multiple plug-in connectors for compressed air and electric and/or fluid control lines are also provided for the driving functions; and (f) means for switching the remote-controlled operation of the driving functions are provided, such that the driving functions of the coupled omnibus or omnibuses can be predetermined or controlled simultaneously and uniformly from the driver's position of the first omnibus of the train.

Thanks to the extendibility and retractability of the front and/or rear coupling, they retain their pleasant appearance when the omnibuses are used on their own, because the couplings can be retracted to behind the outer shell of the vehicles. On the other hand, the couplings, that is at least the front coupling, can be extended to such an extent that the coupling heads can be seen during the coupling operation by the driver of the rear omnibus and can be correspondingly directed.

In order to prevent buckling of the train during combined travel, simultaneous and uniform traction and brake control of all omnibuses joined in the train from the front driver's position is provided. The coupling device therefore does not serve for towing force or braking force transfer, but only for keeping the omnibuses apart. All they have to do is transfer differences in the towing or braking forces between the individual omnibuses, which experience shows are only so small however that there is no danger of buckling, even with the coupling bar in angled position, because the lateral guide forces of the vehicle axles and of the track guidance device are adequately large to be able to absorb reliably the lateral force components induced by an angled position of the coupling bar and differences in towing and braking forces.

Other objects, advantages and novel features of the present invention will become apparent from the following detailed description of the invention when considered in conjunction with the accompanying drawings.

DETAILED DESCRIPTION OF THE DRAWINGS

Figure 1:
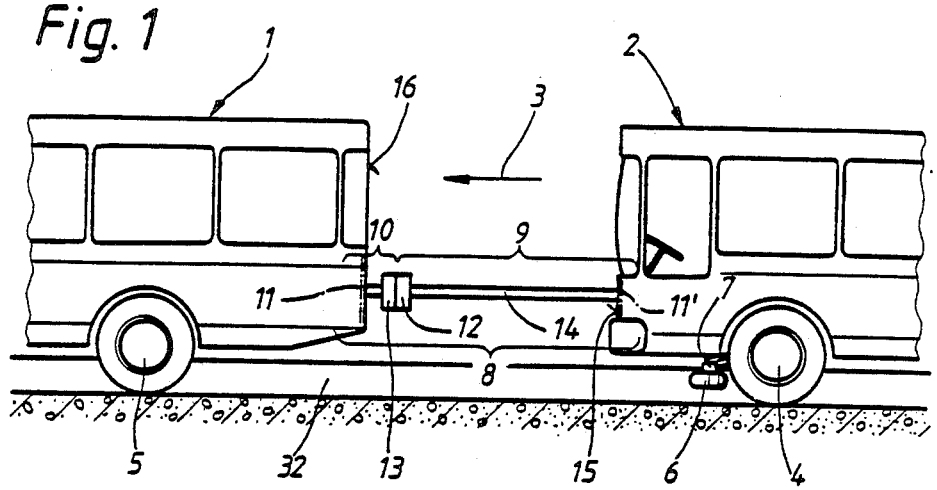
FIG. 1 is a schematic partial side view of two omnibuses coupled together, using a coupling device constructed according to a first preferred embodiment of the invention.
Figure 2:
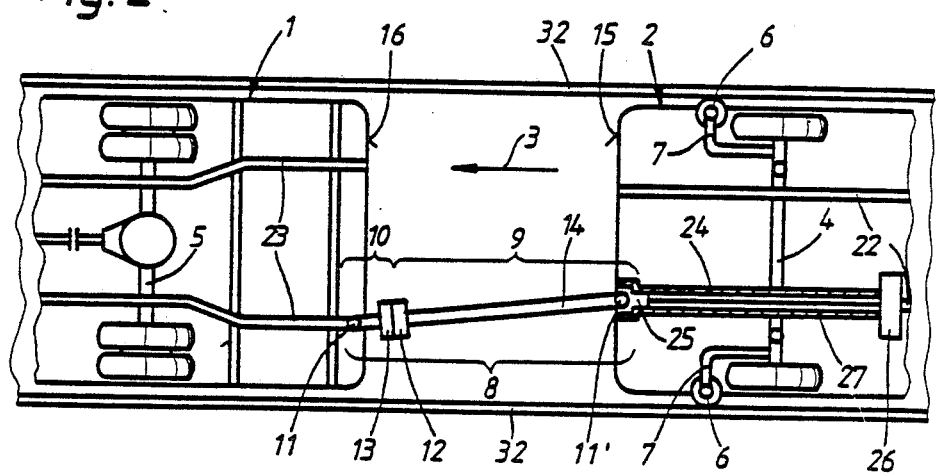
FIG. 2 is a schematic bottom plan view of the arrangement of FIG. 1.
Figure 3:
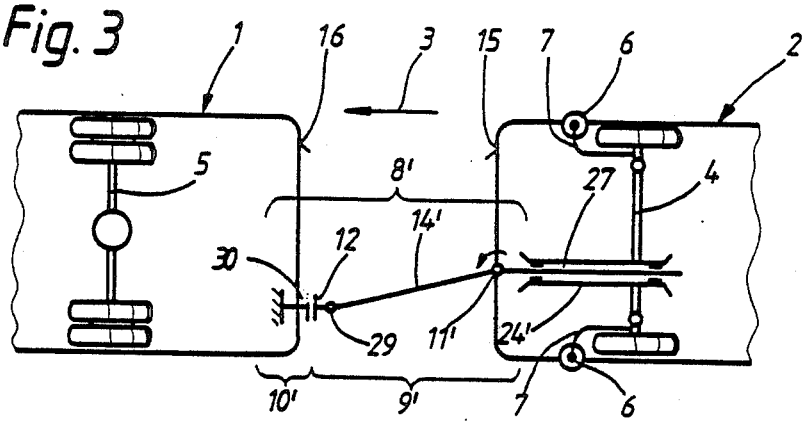
FIG. 3 is a schematic bottom plan view of a further exemplary embodiment of a coupling device for two omnibuses coupled together.
Figure 4:
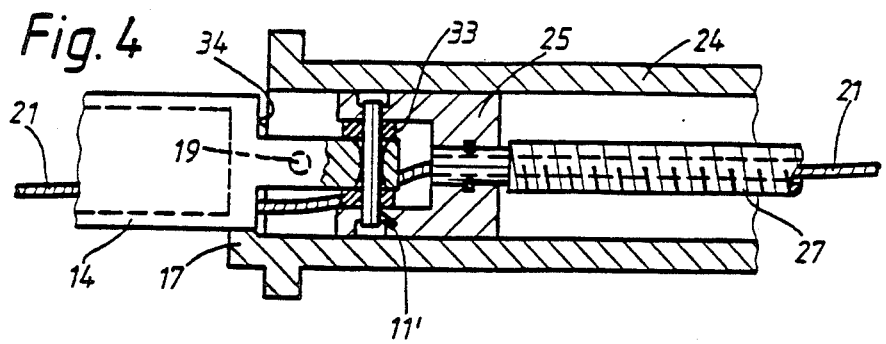
FIG. 4 is a schematic, part sectional enlarged side view of a portion of the coupling device of FIGS. 1 and 2, including a coupling bar and associated guide tube.

FIGS. 1 to 3 show—in different exemplary embodiments—two omnibuses 1 and 2, which are coupled together in line in travelling direction 3 by means of coupling devices 8, 8'. The front omnibus 1 is only shown with its rear section and its driven rear axle 5, while the rear omnibus 2 is only shown with its front section and its steered front axle 4. The track guidability of the omnibuses is provided by lateral guide rollers 6 which are assigned rigidly in unchanged relative position to the locking front wheels via holding arms 7. The lateral guide rollers 6 interact during track guidance with lateral guide flanges 43 arranged laterally on the carriageway and determining the track.

The coupling devices 8, 8' are divided or divisible into a front coupling 9, 9' and into a rear coupling 10, 10', which are assigned to the front area and the rear area, respectively, of each of the two omnibuses 2 and 1. The front and rear couplings are each also respectively assigned a front coupling head 12 and a rear coupling head 13 which, upon mutual approach, can positively lock independently to form an intrinsically rigid pulling/pushing element.

The rear coupling 10, 10' is very short, so that the omnibus is not disfigured in an unacceptable way by a protruding rear coupling, especially as the rear area in any case often has coupling devices. The coupling device may be located so far inside the vehicle according to certain contemplated embodiments that the rear coupling head 13 and 30 (FIG. 3) finishes virtually flush with the rear end face 16. Therefore, as a rule it is possible to dispense with a retractability for the rear coupling for reasons of aesthetics. Furthermore, with an unretractable rear coupling, the latter is always accessible for an omnibus to be coupled which is approaching from the rear, so that it is not necessary for there first to be an involved communication procedure between the two omnibuses before the rear coupling is made appropriately ready.

The situation is different on the other hand with the front coupling 9, 9' and 9" of the second omnibus 2, from whence the coupling operation is to be carried out or controlled. The front coupling 9, 9', and 9" of the exemplary embodiments shown is designed in the form of a bar 14, 14' and 14" which can be extended from the front end face 15 of the omnibus 2 in travelling direction 3 under remote control and can be retracted again as well into the contour of the vehicle when the front coupling is not in use, so that when the vehicle is used on its own it retains its customary pleasant appearance. For reasons of pleasant appearance, and also for reasons of guarding against spray, the opening in the front end face 15, behind which the front coupling 9 can be retracted, may expediently be closable by a sliding element when not in use according to especially preferred embodiments. This sliding element may expediently be operable simultaneously with the remote-controlled displacement of the front coupling, likewise under remote control.

In order that the omnibuses coupled together can, in spite of the shear-resistant bar 14 and the front and rear coupling heads 12 and 13 being locked into an immovable unit, nevertheless move mutually in horizontal and vertical directions and can also execute rolling and rocking movements independently of each other, corresponding horizontal swivel bearings 11, 11' and 29 are fitted in the front and rear areas of the bar, which bearings allow not only a horizontal swivelability but also a swivelability in the other directions of movement mentioned. In the case of the exemplary embodiment according to FIGS. 1, 2 and 4 to 7, the front horizontal swivel bearing 11 is fitted in front of the rear coupling head 13 and the rear horizontal swivel bearing 11' is fitted at the rear end of the bar 14. In this case the corresponding horizontal swivel bearing is arranged in the area of the front or rear end face 15 and 16, respectively. The situation is also similar in the case of the exemplary embodiment according to FIG. 3; here too, the rear horizontal swivel bearing 11' is arranged in the area of the front end face 15 with extended bar 14'. However, unlike the exemplary embodiment according to FIGS. 1 and 2, the front horizontal swivel bearing 29 is fitted behind the front coupling head 12 in the area of the bar 14'. The rear coupling head 30 may, for this reason, be rigidly assigned in a particularly simple way to the front omnibus 1. In any event, this rear coupling head 30 may be fitted such that it can rotate easily about an axis parallel to the travelling direction 3, in order to be able to allow the two vehicles 1 and 2 coupled together to execute rolling movements independently of each other.

In a structurally particularly simple way, the front coupling 9 and the rear coupling 10 are fitted off-center to the frame side member 22 and 23 respectively, on the side of the driver's position. As a result, a crosspiece for a central fitting of the front and rear coupling is saved because the vehicle frame side member 23 is aligned therewith. Furthermore, the vehicle frame is particularly capable of withstanding high loads at the positions of the frame side members 23. The selection of the frame side member on the driver's side is therefore particularly expedient because the front and rear coupling heads can then be seen particularly well by the vehicle driver during the coupling operation. The frame side members do admittedly have a different lateral position in the front area and in the rear area in the illustrated embodiment, so that, seen in the plan view according to FIG. 2 or FIG. 3, an angled arrangement of the bar 14 and 14' with respect to the travelling direction 3 is produced. This angled position of the bar is, however, unobjectionable in practice, for reasons still to be discussed below, because the bar is only loaded by differences in pushing and pulling forces and only serves as a spacer. The bar can readily perform this function even in angled position and with off-center arrangement.

The bar 14, 14' and 14" of the front coupling 9, 9', and 9" is guided in a guide tube 24, 24' and 24" for retraction and extension with the guide tube structurally integrated in the front frame side member 22 on the driver's side. At the rearward end of the bar 14, 14', 14", the latter is connected via the already mentioned rear horizontal swivel bearing 11' and 11" to a shifting head 25 and 25', which can be displaced in the guide tube 24, 24' and 24". The shifting head 25 and 25' has, just like the guide tube 24, 24' and 24", a non-circular, preferably rectangular, cross-section, as a result of which the shifting head 25 is guided securely against twisting. The same also applies moreover to the bar 14'; it also essentially fills the rectangular clear space of the guide tube 24 completely and is guided in it free of play. In the case of the exemplary embodiment according to FIGS. 4 to 7, the rear horizontal swivel bearing 11' is designed such that it also allows vertical movements of the bar 14, which is achieved for example in that the corresponding eye on the bar is designed highly spherical or double-conical and is held on top and underneath by rubber liners.

The shifting head 25 and 25' can be displaced by means of a threaded drive mechanism. In the case of the exemplary embodiment according to FIGS. 4 to 7, the shifting head 25 is connected for this purpose to a threaded tube 27. To be precise, the end of threaded tube is borne in the shifting head 25 such that it is axially unyielding but rotatably. The threaded tube 27 projects into an axially fixed rotatably drivable nut and can be axially displaced by the latter. In FIG. 2, the corresponding drive nut 26 is shown diagrammatically. The tubular shape of the threaded spindle is provided in order to be able to accommodate control lines 21 through the threaded tube 27, the significance of which lines is discussed below.

In the at least partially extended state of the bar 14, necessary for coupling, said bar is held with respect to the vertical and horizontal directions such that the two front and rear coupling heads 12 and 13, to be locked to each other, meet in vertical and lateral directions if the two omnibuses 1 and 2 to be coupled together are in line one behind the other in travelling direction 3. A small positional deviation may be permitted within certain limits; this positional inaccuracy may be compensated by opposite funnel-like design of the locking elements, which initiates a corresponding capture movement.

Figure 5:
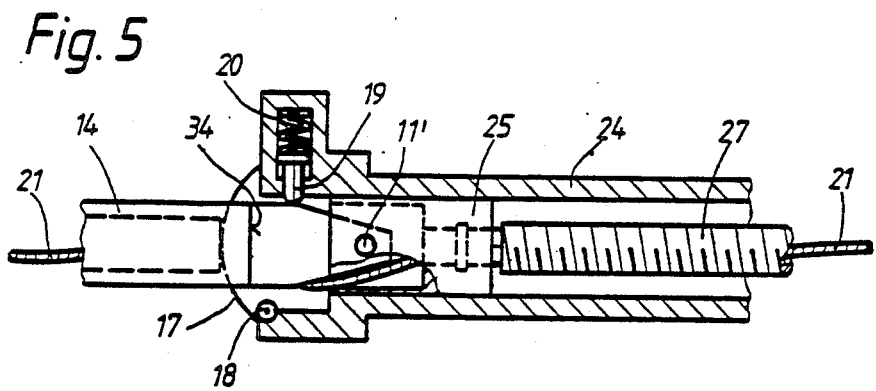
FIGS. 5-7 are schematic part sectional plan views of the coupling device portion shown in FIG. 4, depicting the parts in respective different operating positions.
Figure 6:
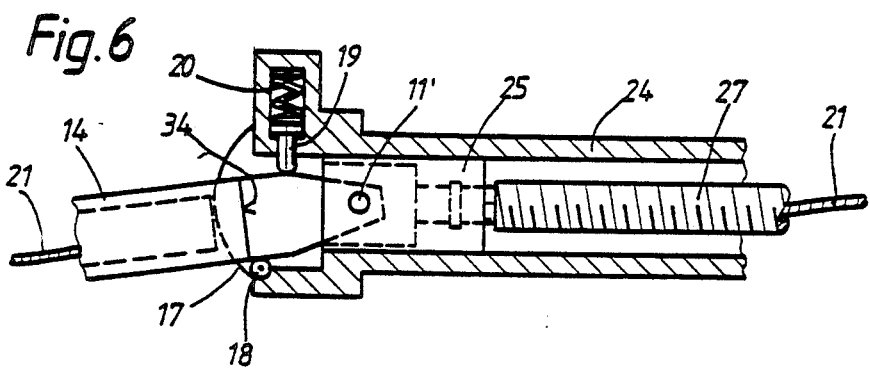
Figure 7:
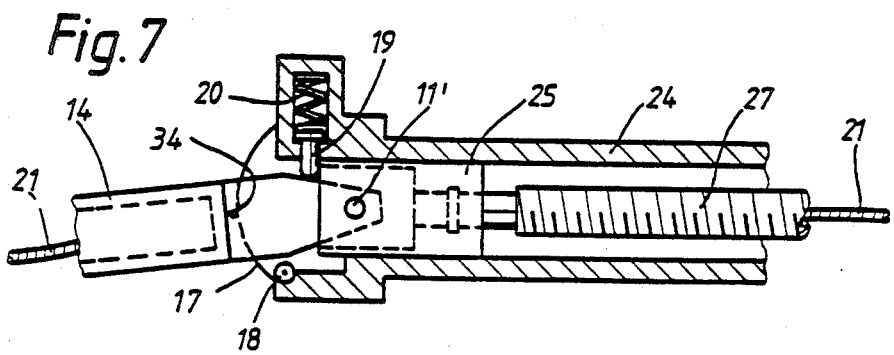
Figure 8:
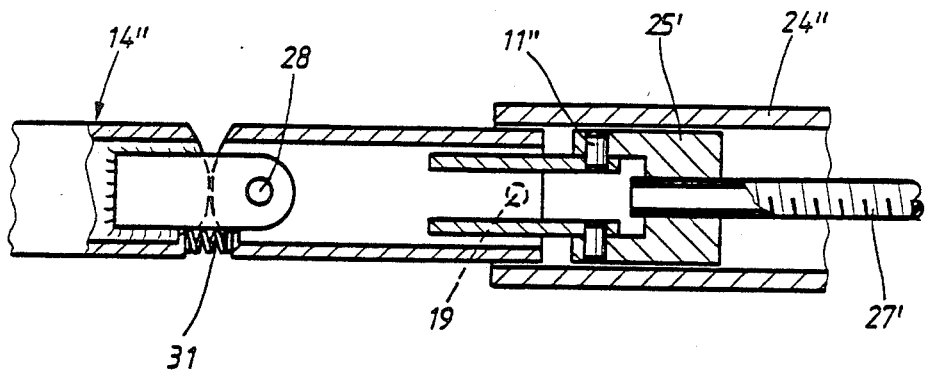
FIG. 8 is a schematic part sectional side view similar to FIG. 4 but showing a further exemplary embodiment of a coupling bar with guide tube.
Figure 9:
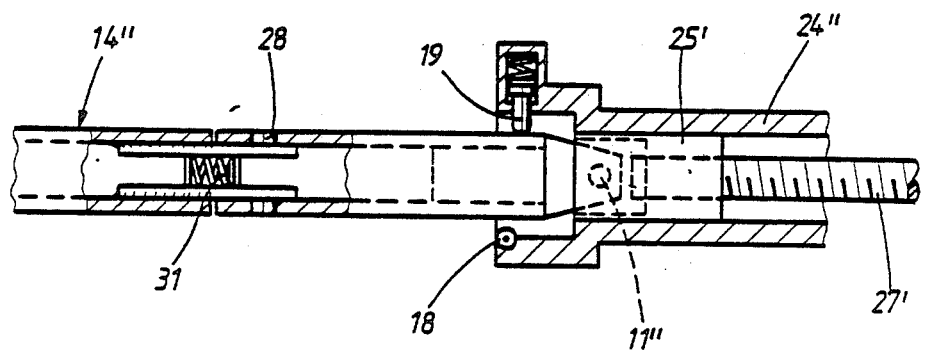
FIG. 9 is a schematic part sectional plan view of the coupling device of FIG. 8.

In the case of the exemplary embodiment shown in FIGS. 4 to 7, the vertical alignment of the bar in the virtually extended state is formed by the vertical stop 17 at the front end of the guide tube 24, on which the bar 14 rests due to gravity with its rear end. In the completely extended state of the bar, the rear edge 34 of the latter runs over this stop 17 and may, in the coupled state, be moved freely without hindrance even in vertical direction. This completely extended state is shown in FIG. 7 in plan view representation. Since it may be assumed that the vertical position of the rear coupling head is the same on all vehicles and does not depend on the precise alignment of the vehicles standing one behind the other, a corresponding horizontal alignment of the bar can be predetermined structurally relatively precisely and it is possible to dispense substantially with a corresponding adjustability. Under certain circumstances, a corresponding vertical alignment can be achieved by selection of a suitable annular rubber buffer 33 with regard to rubber hardeners and/or axial dimension.

The situation is different on the other hand with the alignment of the bar 14 in lateral direction, as can be seen in the plan view representations according to FIG. 3 and according to FIGS. 5 to 7. Here a possibility of lateral alignment of the bar 14 is created by there being in the front area of the guide tube 24 on that side to which the bar 14 is angled off, a lateral stop 18 for the bar 14 and by there being on the opposite side a thrust bolt 19 under the pretension of a compression spring 20. As long as the bar 14 is still partially in the guide tube 24, it will assume the position shown in FIG. 5, aligned with the guide tube 24. However, as soon as the rear edge 34 of the bar 14 has left the effectively guiding section of the guide tube 14, the bar is urged sideways up against the stop 18 by the effect of the compression spring 20. The lateral angled position of the bar 14 can then be changed by selective forward or backward pushing of the shifting head 25: when the shifting head is pulled back, the lateral angular offset becomes less and the further the shifting head 25 is pushed out, the more the bar 14 is included sideways. Since the driver can predetermine this movement under remote control and can also keep a visual check on it, he can bring about a relatively good positional coincidence in horizontal direction between front and rear coupling heads of the omnibuses coupled together, even without maneuvering movements.

At this point, another possibility for the lateral alignment of the bar 14 should be mentioned. To be precise, it is contemplated according to certain embodiments also to arrange the side stop 18 such that it is movable and to provide it with a remotely controllable actuating drive. Then, a corresponding lateral alignment of the bar 14 or of the front coupling head 12 can likewise be performed by remote-controlled displacement of the lateral stop 18.

Thanks to the structural possibilities described, two buses can therefore be coupled together from the driver's seat of the rear bus under remote control without a further person being necessary or the driver having to get out.

In order to make troublefree driving operation possible with such a train of omnibuses, and to avoid the risk of buckling due to the angled bar 14, it is envisaged on the individual omnibuses that at least the driving functions, such as for example, traction, gear changing and braking, can be operated in a way known per se in each case from the driver's position under remote control. As well as the coupling heads 12 and 13, multiple plug-in connectors for compressed air and electric and/or fluid control lines 21 are also provided for these driving functions. These multiple plug-in connectors are also coupled together simultaneously and likewise independently when the coupling heads engaged. The plugging together of the control lines has the effect that the driving functions which can be actuated in them are independently switched to the driver's position of the first omnibus at the head of the train, so that all omnibuses coupled together in the combined train can be controlled simultaneously and uniformly with respect to their driving functions. Since this technique is already known from the field of rail vehicles, further details of the corresponding switching capability are not given here. All that should be mentioned is that a sensor element for remote control of the respective driving functions is fitted at the corresponding accelerator or brake pedal or at the gear shift lever, which sensor element generates, position-dependently, a corresponding electric signal, which is converted at the drive engine or at the brakes, servo-assisted, into a corresponding actuation signal. The coupling of the second bus to the first has the effect that the sensor elements of the driver's position of the first bus are then simply connected in parallel to the sensor elements at the driver's position of the second bus, so that the final control elements at the engine or at the brakes of the second omnibus can be actuated from the driver's position of the first bus, just as if the actuation were to be performed from the driver's position of the same omnibus. This is how the simultaneous and uniform actuation of all coupled omnibuses, already mentioned, comes about, so that all buses are actuated to the same extent with regard to traction and braking. Any differences in traction are only relatively small and only lead to relatively small loads on the coupling bars between the omnibuses. These coupling bars have—as said—only the function of keeping the omnibuses coupled together at a constant distance, but not the purpose of transferring towing or braking forces, even if they do also assume this function to a limited extent. Thanks to the low tensile or compressive loading of the coupling bars, the omnibuses coupled together can also be kept reliably on track even with an angled position and off-center arrangement of the bars. Any transverse force components which may be introduced as a result can in any case be absorbed reliably by the vehicle wheels.

The advantage of the omnibus design according to the invention is that the omnibuses can be coupled together or uncoupled quickly without involved manipulations and without additional assistance and that they can retain their customary appearance, accepted by the public. Thanks to the coupling into one uniform train of several omnibuses of different routes on a shared section which they cover, higher vehicle densities can be allowed on these shared sections.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. Omnibus which is suitable for train formation and which can be driven independently and can be selectively freely steered and guided on tracks, said omnibus being selectively connectable via a divisible coupling device to another omnibus of the same type, said coupling device including a front coupling flexibly articulated in the front area and a rear coupling flexibly articulated in the rear area of each respective omnibus intended for train formation, horizontal swivel bearings of the front coupling and of the rear coupling, intended for a horizontal swivelling, being assigned, in plan view of the omnibus, to the latter in each case in defined position, which front coupling and rear coupling are respectively provided with a front coupling head and a rear coupling head corresponding to each other and, upon mutual approach of a front coupling of one omnibus to the rear coupling of another omnibus, of the same type, can positively lock independently with their coupling heads to form an intrinsically rigid pulling/pushing element, characterized by the combination of the following features:

(a) at least the front coupling is designed in the form of a bar which can be exended from the outer contour of the omnibus in travelling direction or retracted into it under remote control, and in the not yet completely extended state, guided such that it can only be moved longitudinally;

(b) the horizontal swivel bearings of the front coupling and of the rear coupling are—in the extended state of the parts of the coupling device prepared for a coupling of omnibuses—in each case arranged in the area of the front or of the rear outer contour, respectively, of the omnibus;

(c) in the at least partially extended state necessary for coupling, the bar is held by buffers, stops or the like with respect to the vertical direction and the horizontal direction in the coupling position necessary for the coupling of the omnibuses standing in line one behind the other in travelling direction;

(d) at least the driving functions such as traction, gear changing and braking of the omnibuses suitable for train formation can be operated in a way known per se in each case from the driver's position under remote control;

(e) as well as the coupling heads, multiple plug-in connectors for compressed air and electric and/or fluid control lines are also provided for the driving functions; and (f) means for switching the remote-controlled operation of the driving functions are provided, such that the driving functions of the coupled omnibus or omnibuses can be predetermined or controlled simultaneously and uniformly from the driver's position of the first omnibus of the train.

2. Omnibus according to claim 1, wherein at least one of the front coupling and the rear coupling are fitted off-center to a frame side member of the omnibus on a side of the driver's position.

3. Omnibus according to claim 1, wherein the bar of the front coupling is guided in a guide tube and is selectively retractable into and extended from the guide tube.

4. Omnibus according to claim 1, wherein to bring about the coupling position of the extended bar of the front coupling, the buffers, stops or the like can be changed in their pretensioning or position from the driver's position under remote control such that the coupling position of the bar can be changed.

5. Omnibus according to claim 4, wherein at least one of the front coupling and the rear coupling is accessible via an opening in the omnibus bodywork, which opening can be closed by a sliding element when the respective at least one of the front coupling and rear coupling is not in use.

6. Omnibus according to claim 1, wherein, instead of a horizontal and/or vertical swivelability of the rear coupling, a corresponding link is fitted behind the front coupling head in the bar (FIG. 3).

7. Omnibus according to claim 1, wherein the bar is connected at the rear end via the horizontal swivel bearing to a shifting head which remains in the guide tube and is guided securely against twisting therein and which can be retracted or extended in the guide tube by means of a threaded drive mechanism which can be driven by auxiliary energy.

8. Omnibus according to claim 1, wherein the rear coupling is laterally offset with respect to the front coupling, seen in the omnibus travelling direction—such that the position of the bar is—seen in plan view—angled off sideways with respect to the travelling direction on omnibuses coupled together in line one behind the other in travelling direction, wherein in the front area of the guide tube, on that side to which the bar is angled off, there is a lateral stop for the bar and wherein on the opposite side there is a thrust bolt, a pressure roller or the like under pretension.

* * * * *